United States Patent [19]

Schulz

[11] 4,092,686

[45] May 30, 1978

[54] TAPE WITHDRAWAL AND TENSIONING MECHANISM FOR VIDEO CASSETTE RECORDER/REPRODUCER

[75] Inventor: Gordon Schulz, Villa Park, Calif.

[73] Assignee: Odetics, Inc., Anaheim, Calif.

[21] Appl. No.: 658,689

[22] Filed: Feb. 17, 1976

[51] Int. Cl.² ............. G11B 5/008; B65H 17/48; G11B 15/66

[52] U.S. Cl. .................. 360/95; 242/55.19 A; 360/85

[58] Field of Search ............... 360/85, 95; 242/55.19 A

[56] References Cited

U.S. PATENT DOCUMENTS

| | | | |
|---|---|---|---|
| 3,770,902 | 11/1973 | Witt | 360/85 |
| 3,851,816 | 12/1974 | Katoh | 360/95 |
| 3,878,114 | 4/1975 | Lancor, Jr. et al. | 360/95 |

Primary Examiner—Daryl W. Cook
Attorney, Agent, or Firm—Philip M. Hinderstein

[57] ABSTRACT

A mechanism for use with a video recorder/reproducer of the type which receives a standard video cassette for withdrawing the video tape from the cassette to prepare the tape for threading around a video scanner, for sensing tape position to provide inputs to the reel drive servo motors of independent, closed loop servo systems, and for adjusting the level of tension in the video tape during operation of the recorder/reproducer. The mechanism withdraws the tape in two diverging directions, equally from both reels. The tension level is controlled accurately and is selectively changed for different operating modes.

27 Claims, 6 Drawing Figures

TAPE WITHDRAWAL AND TENSIONING MECHANISM FOR VIDEO CASSETTE RECORDER/REPRODUCER

BACKGROUND OF THE INVENTION

1. Field of the Invention

The present invention relates to a tape withdrawal and tensioning mechanism for a video cassette recorder/reproducer and, more particularly, to a mechanism for accurately and reliably withdrawing tape from a video cassette to prepare the tape for threading around a video scanner and for controlling the tension in the tape.

2. Description of the Prior Art

Video recording tape is commonly supplied in a standard type of cassette to eliminate the problems associated with open reels and the threading of the tape into a video recorder/reproducer. When using a standard video cassette with a video recorder/reproducer, the cassette must be loaded into the system and the reels within the cassette must be mated to the reel drive system of the recorder/reproducer. Thereafter, the tape must be withdrawn from the cassette so that it may be threaded around the video scanner of the recorder/reproducer.

The video recorder/reproducers and associated mechanisms that have been developed heretofore have been intended for use in the recording and playing back of standard television type signals in either a home or commercial environment. In such systems, each tape is not used extensively and the information recorded thereon is relatively unimportant so that the careful handling of the tape to maximize the life thereof and to preserve the information thereon has not been an important requirement. For similar reasons, accuracy and reliability of operation have been relatively unimportant considerations. It has also been relatively unimportant that a tape recorded on one machine be playable on another machine and vice versa since usually a single machine was used for recording and playing back information.

Furthermore, in prior systems, the tape travels at low speeds, typically 3¾ inches per second during playback and 45 inches per second during rewind. As a result, controlling the tension in the tape has also been relatively unimportant and an open loop system has generally been used. In other words, a friction break system has been applied to the supply reel to keep the tension within a given range and a friction clutch drive system has normally been utilized for the take-up reel to apply a constant torque thereto and to control the tension in the tape.

On the other hand, the present mechanism is designed for a video recorder/reproducer intended for use in a document acquisition and retrieval system. This environment places a number of constraints on the video tape and the manner in which it is handled which cannot be satisfied with conventional tape handling mechanisms. For example, in such an environment, significant quantities of data, including address information, may be loaded on a sigle tape, representing a substantial investment in programming and information. Furthermore, the tape may be loaded and unloaded into the system many times each day. Therefore, in order to preserve the data and to maximize the life of the tape, it becomes critical that the tape be protected and handled in a very gentle manner. Since a tape will typically be recorded in one machine and played back in another machine, it is important that the mechanism that handles that tape does so accurately and reliably so that the tape does not sense any differences from one machine to another.

Still further, in a document acquisition and retrieval system, the tape travels in two directions, during a search mode, at speeds in excess of 400 inches per second and the tape accelerates to such speeds in approximately one second. In handling tape under such conditions, constant torque drive systems and friction breaks simply cannot provide the tape constraints necessary to make a workable system. Servo motors and closed loop servo systems must be used and the tension in the tape must be accurately controlled in order to insure proper tracking and winding of the tape. A video cassette recorder/reproducer incorporating a mechanism which handles tape in a manner which meets the above requirements has been unavailable heretofore.

SUMMARY OF THE INVENTION

According to the present invention, there is provided a mechanism for withdrawing tape from a video cassette to prepare the tape for threading around the video scanner of a video cassette recorder/reproducer. The present mechanism draws the tape out in two directions, equally from both reels. The velocity component of the tape coming out of the cassette follows a sinusoidal relationship so that the tape is treated gently, maximizing the life thereof and preserving the data thereon. The present mechanism is simple, accurate, and reliable and provides the constraints necessary for use in a document acquisition and retrieval system. The tape is handled accurately enough that tapes recorded on one machine may be readily played back on another machine.

The present mechanism for withdrawing tape from a video cassette simultaneously operates to control tape tension and to sense tape position to provide the inputs to independent closed loop servo systems for controlling the position of the tape. The present mechanism automatically adjusts the tension in the tape, depending upon the operating mode it is in, thereby placing the necessary constraints on the tape for its intended purpose.

Briefly, the present mechanism comprises a pair of compliance arms, a tape pick-up roller mounted at one end of each compliance arm, a pair of transfer arms, means for mounting one ends of the transfer arms at spaced locations for pivotable movement between first and second positions, the transfer arms pivoting in opposite angular directions, means for mounting the other ends of the compliance arms on the other ends of the transfer arms, the compliance arms being positioned so that the pick-up rollers are behind the tape when the tape is fully retracted within the cassette and the transfer arms are in the first positions, means for driving the transfer arms from the first to the second positions, and means for pivoting the compliance arms relative to the transfer arms, in opposite angular directions, during movement of the transfer arms from the first to the second positions whereby the rollers withdraw the tape from the cassette. A spring force is applied to each compliance arm in the operative positions thereof to control the tension in the tape which is wrapped around the pick-up rollers mounted thereon. The angular movements of the compliance arms are sensed to provide the required inputs for a pair of independent servo motors for driving the reels of the video cassette. The spring force applied to either of the compliance arms may be selectively increased and this increase occurs during the high speed search mode to increase the tension in that the portion of the tape being conducted to the take-up reel to insure proper winding of the tape thereon.

OBJECTS

It is therefore an object of the present invention to provide a tape withdrawal and tensioning mechanism for a video cassette recorder/reproducer.

It is a further object of the present invention to provide a mechanism for withdrawing tape from a video cassette to prepare such tape for threading around the video scanner of a video recorder/reproducer.

It is a still further object of the present invention to provide a tape handling mechanism which senses tape tension to provide the necessary inputs for a closed loop servo system.

It is another object of the present invention to provide a tape handling mechanism for a video cassette recorder/reproducer which selectively adjusts the tension in the tape.

It is still another object of the present invention to provide a tape withdrawal and tensioning mechanism for a video cassette recorder/reproducer which handles tape gently, reliably, and accurately.

Another object of the present invention is the provision of a tape handling mechanism for a video cassette recorder/reproducer which permits tapes recorded on one recorder/reproducer to be accurately played back on another recorder/reproducer.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

DESCRIPTION OF THE PREFERRED EMBODIMENT

Figure 1:
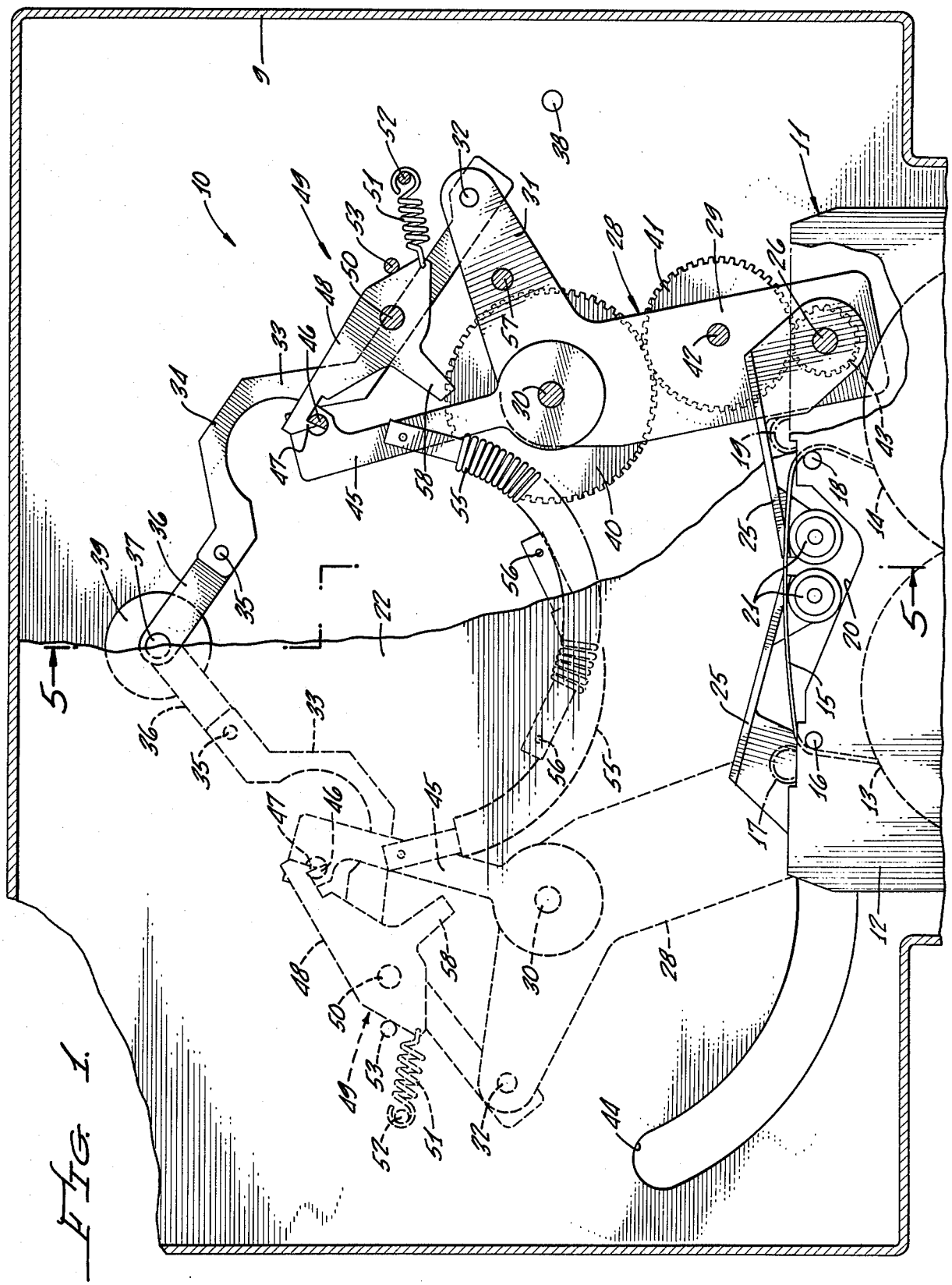
FIG. 1 is a top plan view of a tape withdrawal and tensioning mechanism for a video cassette recorder/reproducer constructed in accordance with the teachings of the present invention, showing the mechanism in the initial or cassette receiving position.

In my copending U.S. patent application Ser. No. 650,455, filed Jan. 19, 1976, and entitled Cassette Loader for Video Recorder/Reproducer, now U.S. Pat. No. 4,018,403, there is disclosed a loading mechanism for reliably delivering a standard video cassette onto a pair of reel drive hubs of a video recorder/reproducer, insuring proper seating of the reels on the hubs, and preventing jamming of the video tape. Furthermore, in my copending U.S. patent application Ser. No. 650,456, filed Jan. 19, 1976, and entitled Tape Reel Drive System for Video Recorder/Reproducer, now U.S. Pat. No. 4,000,866, there is disclosed a tape reel drive system including a pair of reel drive hubs for positively engaging the tape reels of a standard video cassette and simultaneously taking up any slack in the tape extending between the reels. Accordingly, operation of the inventions of my copending applications results in a standard video cassette being positioned within a video recorder/reproducer, ready for the tape to be withdrawn therefrom for threading around the video scanner of the recorder/reproducer. It is the function of the present mechanism, generally designated 10, to perform this latter function as well as to perform several additional functions.

More particularly, mechanism 10 is positionable in a housing 9 and is designed to operate on a standard video cassette 11 of a type well known to those skilled in the art. Cassette 11 includes a case 12 which houses a pair of reels 13 and 14 which have a length of tape 15 extending therebetween. Tape 15, upon emerging from reel 13, passes between a pair of rollers 16 and 17, across the front of case 12, and between a pair of rollers 18 and 19 to reel 14. A slot 20 is provided in a bottom of case 12 to permit cassette 11 to be lowered over at least one pick-up roller which thus becomes positioned behind tape 15 so that it may be utilized to withdraw tape 15 from case 12 of cassette 11. For a fuller discussion of a cassette loader and the manner in which it delivers a cassette into a video recorder/reproducer, reference should be had to U.S. Pat. No. 4,018,403.

Upon reaching the loaded position, shown in FIGS. 1-5, reels 13 and 14 are positioned on a pair of hubs (not shown) which are driven by independent servo motors (not shown). For a fuller discussion of a complete tape reel drive system, reference should be had to U.S. Pat. No. 4,000,866.

According to the present invention, mechanism 10 includes a pair of identical pick-up rollers 21 for withdrawing tape 15 from cassette 11. The initial positions of rollers 21 are shown in FIG. 1 where cassette 11 has been loaded into mechanism 10 in housing 9 and rollers 21 are positioned behind tape 15. Rollers 21 withdraw tape 15 along approximately linear paths which diverge from cassette 11 at an obtuse angle with respect to each other, rollers 21 coming to rest in the positions shown in FIG. 3. As rollers 21 withdraw tape 15 from cassette 11, tape 15 contacts an elastomeric post 23 which may be mounted on a rotatable turntable 24, not a part of the present invention. For present purposes, post 23 insures that tape 15 is withdrawn equally from both reels 13 and 14, also providing a fixed reference point for the operation of mechanism 10. Upon reaching the position shown in FIG. 3, turntable 24 may be rotated to thread tape 15 around the video scanner (not shown) of a video recorder-reproducer (also not shown). Turntables, video scanners, and video recorder/reproducers are known to those skilled in the art and are not a part of the present invention.

Rollers 21 are part of identical mechanisms for handling tape 15. While the mechanisms are not exact carbon copies of each other, because of the unsymmetrical nature of a standard video cassette, the mechanisms are virtually identical and operate identically. Accordingly, an explanation of the structure and operation of one will suffice to describe the structure and operation of the other and like numerals have been utilized to designate like or corresponding parts. Furthermore, all references in the singular shall be understood to include the plural, where applicable, and vice versa.

Each pick-up roller 21 is connected to one end of a compliance arm 25, rollers 21 and arms 25 being the only elements of mechanism 10 which are positioned above a plate 22 which extends across housing 9 and covers the remaining elements of mechanism 10. The other ends of arms 25 are connected to shafts 26 which extend through slots 44 in plate 22. Each shaft 26 is the output shaft of a potentiometer 27 which is mounted on one end of a transfer arm 28. Potentiometer 27 is a conventional device for measuring the value of resistance for a given position of shaft 26 and provides a media for sensing the angular position of shaft 26 relative to transfer arm 28. Each potentiometer 27 provides output signals proportional to the angular position of its associated shaft 26, the output signals being independently applied to the servo motors (not shown) connected to reels 13 and 14 to drive same as a function of the angular positions of arms 25, as will be described more fully hereinafter. Each shaft 26 of each potentiometer 27 has a zero position and potentiometers 27 provide positive and negative output signals for angular positions of shafts 26 on opposite sides of the zero positions. Accordingly, the housing of potentiometer 27 is rigidly connected to transfer arm 28 and shaft 26 is rigidly connected to compliance arm 25, shaft 26 being free to rotate relative to arm 28.

Figure 2:
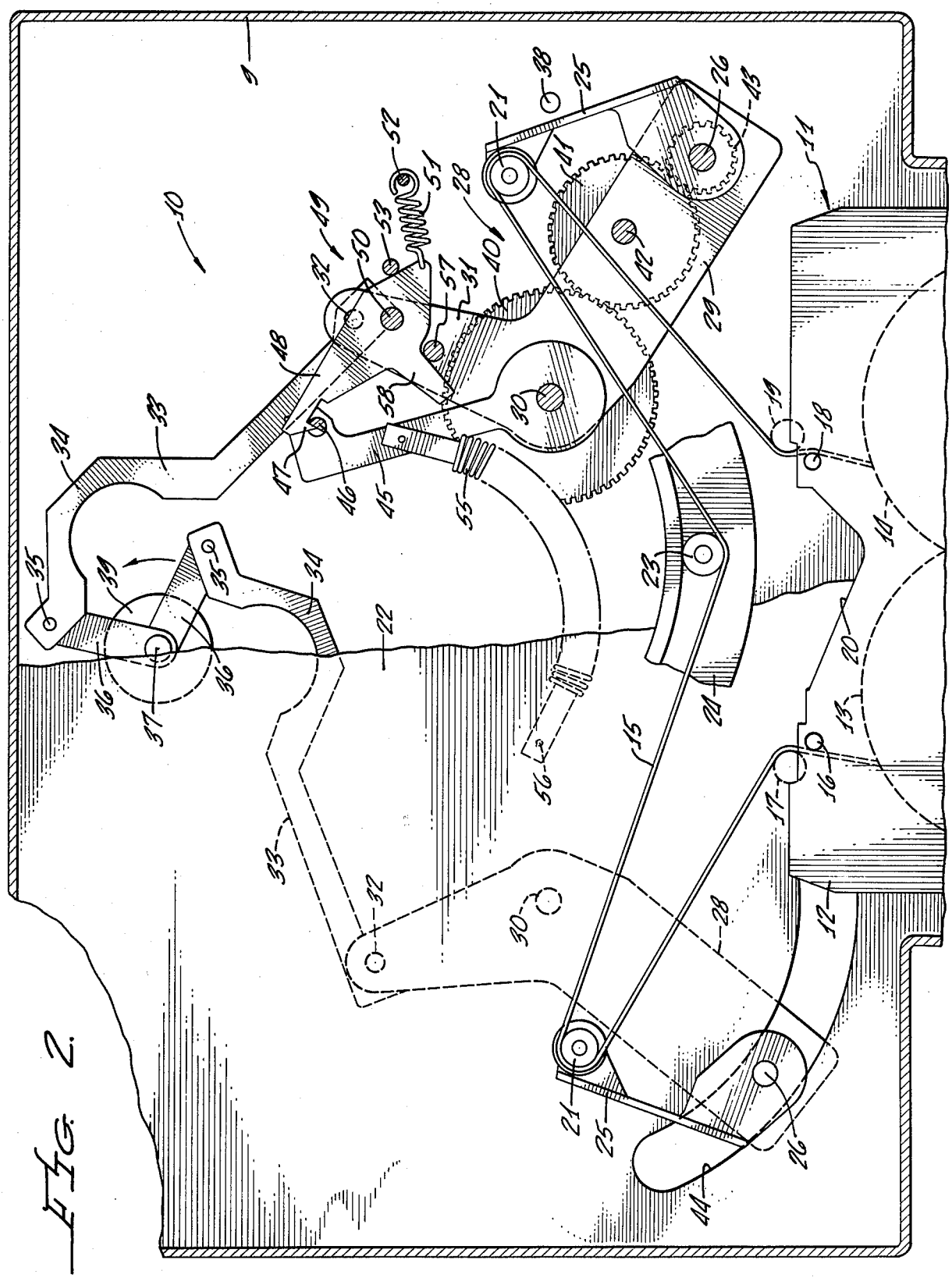
FIG. 2 is a top plan view, similar to FIG. 1, showing the mechanism in an intermediate position.
Figure 3:
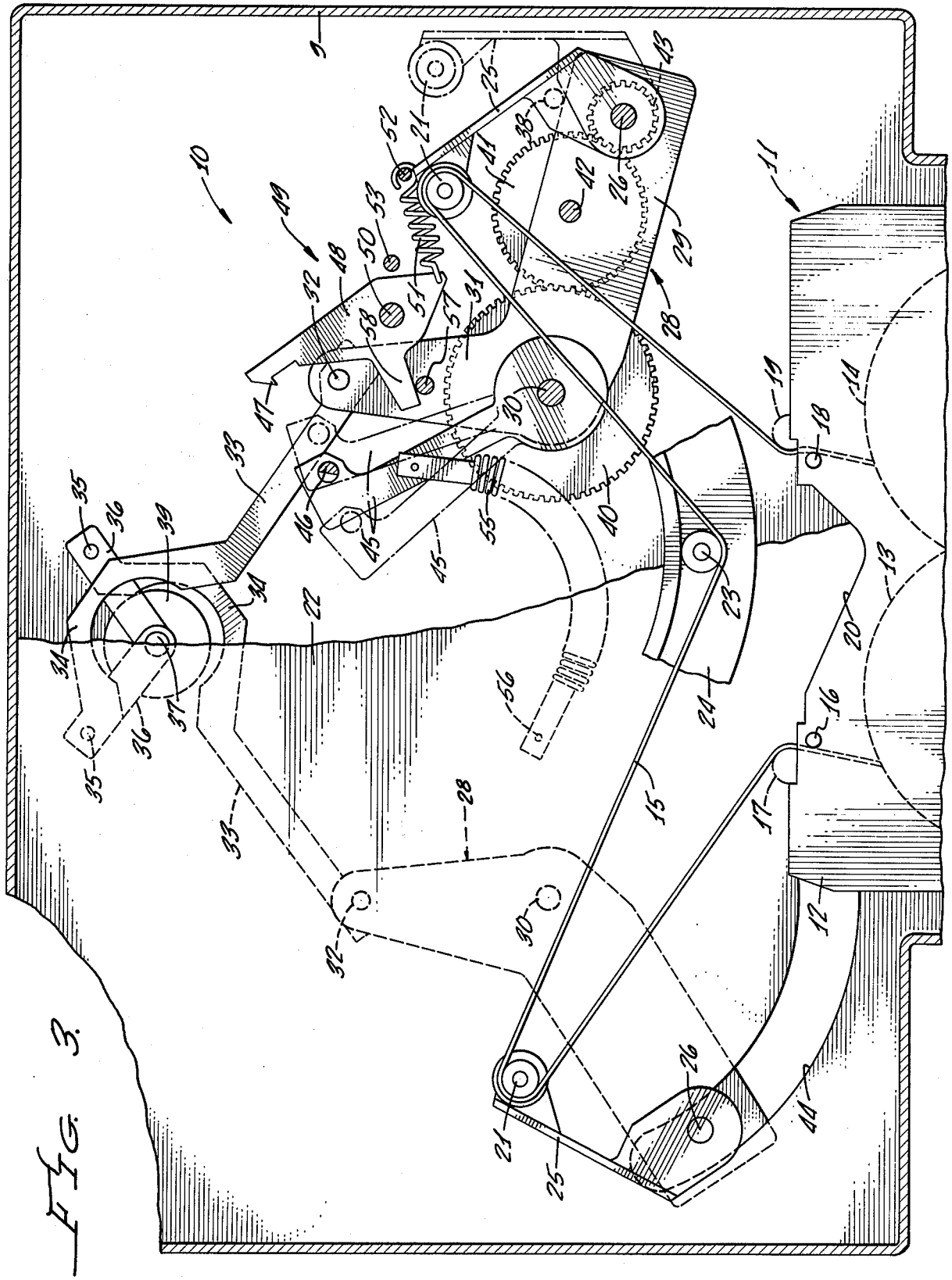
FIG. 3 is a top plan view, similar to FIGS. 1 and 2, showing the mechanism with the tape fully withdrawn and prepared for threading around a video scanner.

Each transfer arm 28 is a generally L-shaped member including intersecting arm sections 29 and 31, the intersection thereof being mounted for rotation on a shaft 30, independently thereof. The free end of arm section 29 has shaft 26 extending therethrough whereas the free end of arm section 31 is connected via a journal 32 to one end of a drive arm 33 which has a C-shaped section 34 adjacent the other end thereof. The other end of arm 33 is connected via a journal 35 to one end of a linkage 36, the other ends of both linkages 36 being connected to a common drive shaft 37. Drive shaft 37 is connected to a motor 39 for rotating shaft 37 and linkages 36. As will be apparent from an inspection of FIGS. 1, 2, and 3, rotation of shaft 37 and linkages 36 in a counterclockwise direction draws drive arms 33 toward shaft 37, causing pivoting of transfer arms 28 about the axes of shafts 30. As will be described more fully hereinafter, drive shaft 37 is operative to rotate through an angle of 180° to move transfer arms 28 from first positions, shown in FIG. 1, to second positions, shown in FIG. 3, FIG. 2 showing intermediate positions of arms 28 between the first and second positions. In the second positions of transfer arms 28, arms 28 contact fixed abutments 38 in housing 9 which define the second positions of arms 28.

Connected to each shaft 30 for rotation therewith is a sun gear 40. Engaging each sun gear 40 is an idler gear 41 mounted for rotation on arm section 29 of transfer arm 28 by means of a journal 42. Engaging said idler gear 41 is a compliance arm drive gear 43 which is connected to shaft 26 for rotation therewith.

Also connected to each shaft 30 is one end of a sun gear actuation arm 45. Accordingly, the rotation of each arm 45 is transmitted to its associated gear 40 via shaft 30. Connected to the other end of arm 45 is a pin 46 which is adapted to be engaged by a hook 47 at one end of an arm 48 of a sear assembly 49. Arm 48 of sear assembly 49 is mounted for rotation about a post 50 which is fixed in housing 9. A spring 51 connected between a fixed post 52 in housing 9 and arm 48 biases arm 48 for rotation around post 50 to bring hook 47 thereof into contact with pin 46. A fixed abutment 53 in housing 9 limits the rotation of arm 48. In any event, in the position shown in FIGS. 1 and 2, hook 47 of arm 48 engages pin 46 on arm 45 and prevents rotation thereof, also preventing rotation of sun gear 40 as transfer arm 28 rotates about shaft 30 from the position shown in FIG. 1 towards the position shown in FIG. 3. Accordingly, rotation of transfer arms 28 causes rotation of idler gears 41 as they move around sun gears 40 and corresponding rotation of compliance arm drive gears 43. Since arms 25 are connected to gears 43 via shafts 26, rotation of transfer arms 28 causes pivoting of compliance arms 25 relative to transfer arms 28, in opposite angular directions, during movement of transfer arms 28 from the first to the second positions. Accordingly, and as can be seen from a comparison of FIGS. 1 and 2, pick-up rollers 21 withdraw tape 15 from cassette 11 as transfer arms 28 are driven by drive shaft 37.

The path of rollers 21 may be readily tailored to satisfy space requirements by selecting the appropriate gear ratios for gears 40, 41, and 43. According to the present invention, the gear ratios of gears 40, 41, and 43 are preferably selected so that rollers 21 travel in approximately linear paths from the positions shown in FIG. 1 to the positions shown in FIG. 3.

Mechanism 10 further includes a pair of constant force springs 55, first ends of which are connected to fixed posts 56 in housing 9 and the other ends of which are connected to arms 45, intermediate the opposite ends thereof. Accordingly, the spring 55 shown in solid lines in FIG. 1 applies a constant clockwise force to its associated arm 45 whereas the spring 55 shown in dotted lines in FIG. 1 applies a constant counterclockwise force to its arm 45. On the other hand, in the positions of transfer arms 28 shown in FIGS. 1 and 2, these forces are ineffective, since arms 45 are locked in position by sear assemblies 49.

Just prior to reaching the second positions of arms 28, sear arms 48 of assemblies 49 are desengaged from arms 45. For this purpose, arm section 31 of transfer arm 28 has a pin 57 connected thereto which is adapted to engage an extension 58 on sear arm 48. When transfer arm 28 reaches the position shown in FIG. 2, pin 57 just comes into contact with extension 58. Further rotation of arm 28 causes rotation of arm 48, around post 50, stretching spring 51, disengaging hook 47 from pin 46 on arm 45. Continued movement of arm 28 continues this rotation of arm 48 until it is completely clear of arm 45 and pin 46 mounted thereon, as shown in FIG. 3.

The operation of the components of mechanism 10 described hereinabove may now be better understood. In the initial position of mechanism 10, as shown in FIG. 1, cassette 11 is loaded into mechanism 10 to position pick-up rollers 21 behind tape 15 with tape 15 fully retracted within case 12 of cassette 11. Upon a suitable signal being applied to drive motor 39, drive shaft 37 rotates in a counterclockwise direction, rotating linkages 36 and starting the translation of drive arms 33. As will be apparent from an inspection of FIG. 1, the initial positions of linkages 36 are approximately coaxial with drive arms 33 so that journals 35 begin movement perpendicular to the axes of arms 33. As linkages 36 continue to rotate, a greater component of the velocity of journal 35 is converted to a component coaxial with arms 33. Thus, the drive force applied to arms 33 follows a sinusoidal relationship and this sinusoidal relationship is transmitted via drive arms 33, transfer arms 28, and compliance arms 25 to tape 15. Thus, mechanism 10 withdraws tape 15 from cassette 11 in as gentle a manner as possible, first accelerating the tape velocity and then gradually decelerating the same.

As drive shaft 37 rotates, drive arms 33 cause rotation of transfer arms 28 around the axes of shafts 30. Since arms 48 of gear assemblies 49 are engaging arms 45, sun gears 40 remain stationary during the initial rotation of transfer arms 28. On the other hand, since idler gears 41 are mounted on transfer arms 28 and rotate therewith, idler gears 41 are forced to rotate around journals 42. Similarly, gears 43 are rotated by gears 41, rotating shafts 26 and compliance arms 25 therewith. Accordingly, a positive withdrawal force is applied to rollers 21 to withdraw tape 15 from case 12 of cassette 11.

Upon continued rotation of transfer arms 28, pins 57 thereon contact extensions 58 on sear arms 48, causing rotation thereof and disengagement of hooks 47 from pins 46. Accordingly, when transfer arms 28 reach their second positions, in contact with abutments 38, arms 45 are released.

Transfer arms 28 are arranged to contact abutments 38 just prior to shaft 37 reaching its final position. Accordingly, during the last few degrees of rotation of shaft 37, a tension force is applied to arms 33, which tension force is absorbed, at least partially, by the known spring force in C-shaped sections 34. This known spring force holds transfer arms 28 in contact with abutments 38, providing a fixed position, rigid platform for the further operation of mechanism 10.

Once arms 45 are released and transfer arms 28 are in their second positions, arms 45 and 25 are free to move, the movement of one being conducted to the other via shaft 30, gears 40, 41, and 43, and shaft 26. The spring 55 shown in FIG. 3 applies a clockwise force to arm 45 which is translated into a clockwise force on arm 25. This force applies a tension to tape 15, at least to that portion thereof between post 23 and reel 14. If arm 25 rotates in a clockwise direction, beyond the zero position of shaft 26, a positive signal is applied to the servo motor for reel 14 to cause it to rotate in a direction to wind tape 15 in until arm 25 returns shaft 26 to the zero position. If the same arm 25 rotates in a counterclockwise direction, beyond the zero position of shaft 26, a negative signal is applied by its associated potentiometer 27 to the servo motor for reel 14 to cause it to rotate in a direction to payout tape 15 until arm 25 returns shaft 26 to the zero position. Therefore, the force of spring 55 is counteracted by the servo motor for reel 14 and spring 55 establishes the tension in tape 15 between post 23 and reel 14. Similarly, the other spring 55 establishes a fixed tension in that portion of tape 15 between post 23 and reel 13.

In other words, the servo motors for driving reels 13 and 14 are controlled solely by the outputs of potentiometers 27 which sense tape position by means of compliance arms 25 and rollers 21 which have tape 15 wrapped therearound. Accordingly, when turntable 24 wraps tape 15 around a video scanner including a capstan for driving tape 15 in one direction or the other, the movement of tape 15 is sensed by arms 25 as an increase in tension in one direction and a decrease in tension in the other direction, causing rotation of arms 25 and signaling the servo motors for reels 13 and 14 to rotate in directions to follow the movement of tape 15.

It can be seen that if FIG. 3 represents the zero positions of shafts 26, FIG. 1 represents substantial deviations of shafts 26 from zero positions. Accordingly, in the initial positions of arms 28, the servo motors for reels 13 and 14 must be deactivated. Furthermore, if activation of the servo motors for reels 13 and 14 occurs at any time other than when shafts 26 are in their zero positions, a signal pulse will be applied to such servo motors which would be damaging to tape 15. Accordingly, mechanism 10 is arranged so that when pins 57 just cause the disengagement of sear arms 48 from arms 45, shafts 26 are passing through the zero positions of potentiometers 27. During the initial movement of transfer arms 28, the servo motors connected to reels 13 and 14 are disconnected from their associated potentiometers 27 and simply a low level d.c. voltage would be applied thereto to maintain a slight tension in reels 13 and 14. Microswitches (not shown) could be mounted to sense the rotation of arms 48 at the moment of release of arms 45. Such microswitches would be operative to generate signals for connecting the outputs of potentiometers 27 to their associated reel servo motors. This insures that the transformation from an open loop system to a closed loop system occurs at a time which minimizes the effect on tape 15. Tape 15 is therefore handled directly and gently, minimizing the stresses thereon.

When it is desired to remove cassette 11, it is simply necessary to signal motor 39 to drive shaft 37 to cause it to rotate in an opposite direction through the same angle. The servo motors connected to reels 13 and 14 are simultaneously deactivated and a low level, constant, open loop force is applied thereto to cause tape 15 to be reeled in. As transfer arms 28 return to their initial positions, springs 55 and 51 bring arms 45 and 48 into contact with each other whereby hooks 47 engage pins 46, preparing mechanism 10 for a subsequent withdrawal of tape 15 from cassette 11.

Springs 55 provide the necessary tension in tape 15 during the playing mode of mechanism 10. On the other hand, during a high speed search mode, where tape 15 is rapidly accelerated to a speed in excess of 400 inches per second, the spring 55 which controls the tension in that portion of tape 15 being conducted to the take-up reel does not provide sufficient tension to cause tape 15 to appropriately stack in cassette 11. Accordingly, mechanism 10 includes means for adding an additional force to one of arms 45 to provide the increased tension necessary.

Figure 4:
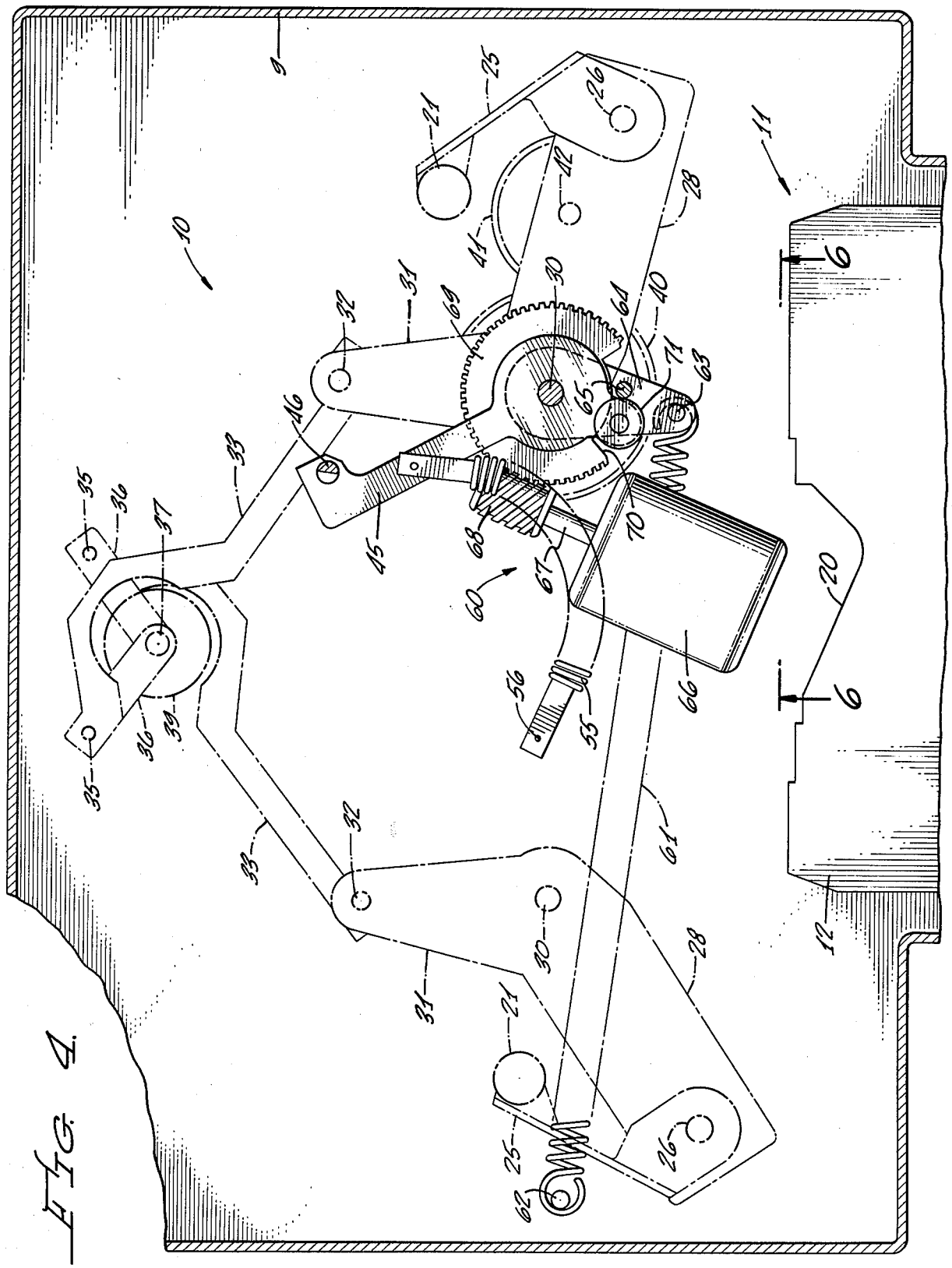
FIG. 4 is a top plan view, similar to FIGS. 1-3, showing one of the mechanisms for selectively increasing the tension level in the tape.
Figure 5:
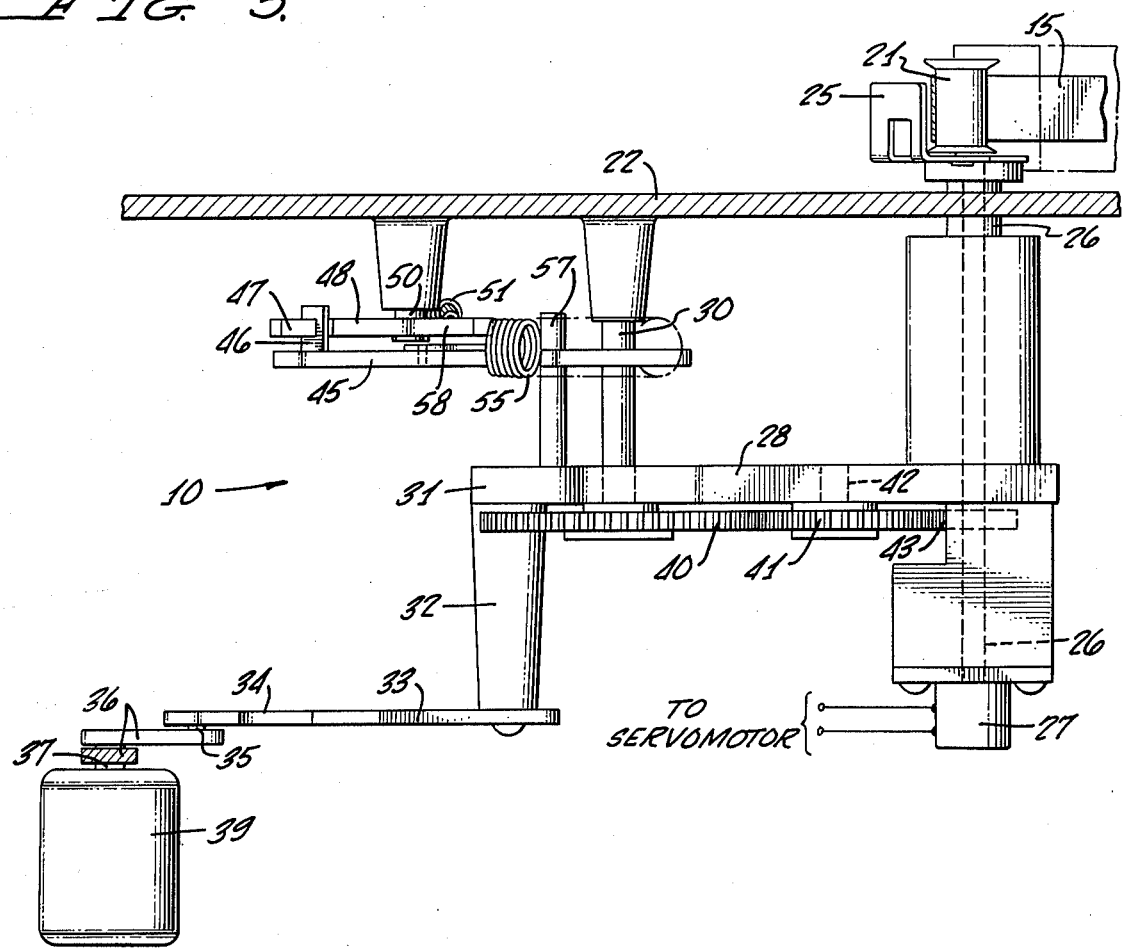
FIGS. 5 and 6 are sectional views taken along the lines 5—5 and 6—6 in FIGS. 1 and 4, respectively.
Figure 6:
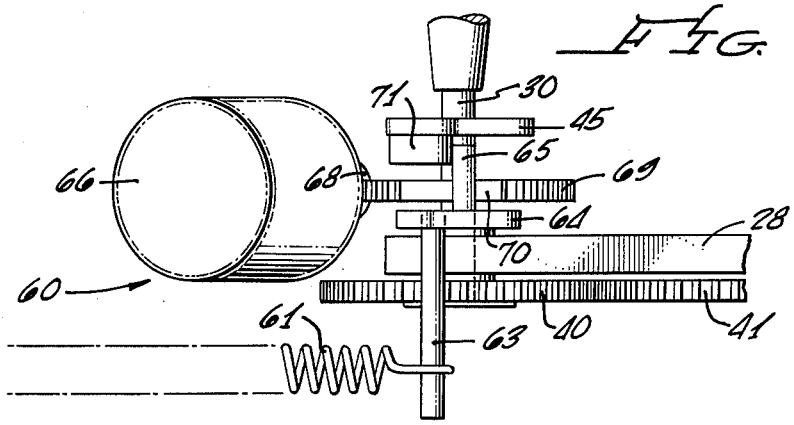

Referring now to FIGS. 4 and 6, this increase in tension is provided by a tension biasing assembly, generally designated 60, there being an identical bias assembly 60 for each of arms 45. Bias assembly 60 includes a spring 61 connected between a fixed post 62 in housing 9 and a pin 63 connected to one end of an arm 64. The other end of arm 64 is mounted for rotation on shaft 30, independently thereof. Intermediate the ends of arm 64 is a second pin 65 which extends parallel to shaft 30, spaced therefrom.

Assembly 60 includes a motor 66 having an output shaft 67 on which is mounted a worm 68. Worm 68 engages a worm gear 69 mounted for rotation on shaft 30, independently thereof. Worm gear 69 is positioned between arm 64 and arm 45. Gear 69 has a slot 70 in the periphery thereof, pin 65 on arm 64 extending upwardly through slot 70. Finally, the end of arm 45 which is connected for rotation around shaft 30 has a roller 71 mounted thereon in a position to engage pin 65 on arm 64.

It can be seen from an inspection of FIG. 4 that in the position of worm gear 69 thereshown, pin 65 rests on roller 71 so that the clockwise force imparted to arm 64 by spring 61 is transmitted via roller 71 to arm 45 to add to the clockwise force applied thereto by spring 55. On the other hand, motor 66 may be selectively energized to cause drive shaft 67 and worm 68 to rotate worm gear 69 in a counterclockwise direction until slot 70 contacts pin 65 and rotates arm 64 in a counterclockwise direction therewith. It is only necessary to rotate gear 69 counterclockwise through an angle of approximately 60° to rotate arm 64 and pin 65 therewith through a sufficient angle to insure that pin 65 will not contact roller 71 during the usual angular travel of arm 45.

In other words, the two motors 66 of the identical bias assemblies 60 would normally maintain pins 65 out of contact with rollers 71 so that springs 55 are the only means of providing the operating tension for tape 15. On the other hand, when the video recorder/reproducer goes into a search mode, a signal is applied to whichever motor 66 is associated with the arm 45 which is controlling the tension in the take-up reel to rotate in a direction to bring pin 65 on arm 64 into contact with roller 71 to instantaneously increase the tension on arm 45 by the tension of spring 61. It should also be noted that one would only increase the tension on the reel that is functioning as a take-up reel since it is the only reel which requires the increased tension.

It can therefore be seen that according to the present invention, there is provided a mechanism for withdrawing tape 15 from a video cassette 11 to prepare tape 15 for threading around a video scanner of a video cassette recorder/reproducer. Mechanism 10 draws tape 15 out in two directions, equally from both reels 13 and 14. The velocity component of tape 15 coming out of cassette 11 follows a sinusoidal relationship so that tape 15 is treated gently, maximizing the life thereof and preserving the data thereon. Mechanism 10 is simple, accurate, and reliable and provides the constraints necessary for use in a document acquisition and retrieval system. Furthermore, tape 15 is handled accurately enough that tapes recorded on one machine may be readily played back on another machine.

Mechanism 10 simultaneously operates to control tape tension and to sense tape position to independently provide the inputs to independent closed loop servo systems for controlling the position of tape 15. Mechanism 15 automatically adjusts the tension level in tape 15 depending upon the mode it is in, thereby placing the necessary constraints on tape 15 for its intended purpose.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. A mechanism for withdrawing tape from a video cassette to prepare said tape for threading around a video scanner and for controlling the tension in said tape comprising:
   a pair of compliance arms;
   a tape pick-up roller mounted on one end of each compliance arm;
   means for mounting the other ends of said compliance arms for pivotal movement between first positions wherein said pick-up rollers are behind said tape when said tape is fully retracted within said video cassette and second positions wherein said tape is withdrawn from said cassette in two diverging directions, said compliance arms being freely, angularly pivotable in said second positions; and
   means for applying an angularly-directed force to said compliance arms when in said second positions, said force being applied by said pick-up rollers to the tape wrapped therearound to control the tension in said tape.

2. A mechanism for withdrawing tape from a video cassette to prepare said tape for threading around a video scanner and for controlling the tension in said tape for use with a closed loop servo system including independent servo motors for driving the reels of said video cassette, comprising:
   a pair of compliance arms;
   a tape pick-up roller mounted on one end of each compliance arm;
   means for pivotably mounting the other ends of said compliance arms, said compliance arms being positionable in first positions wherein said pick-up rollers are behind said tape when said tape is fully retracted within said video cassette, said compliance arms being pivotable to withdraw said tape from said cassette in two diverging directions;
   means for applying a tension force to said compliance arms to control the tension in said tape wrapped around said pick-up rollers thereon; and
   means mounted on said other ends of said compliance arms for independently sensing the angular positions thereof and for providing output signals proportional thereto, said output signals being applied to said servo motors to drive same as a function of the positions of said compliance arms.

3. A mechanism according to claim 2 wherein said angular position sensing means comprises:
   a pair of potentiometers having output shafts, the other ends of said compliance arms being connected to said output shafts for rotation thereof.

4. A mechanism according to claim 3 wherein each of said shafts of said potentiometers has a zero position and provides positive and negative output signals for angular positions of said shafts on opposite sides of said zero positions and wherein said output signals of said potentiometers are applied to said servo motors to drive said motors to maintain said shafts of said potentiometers at said zero positions.

5. A mechanism for withdrawing tape from a video cassette to prepare said tape for threading around a video scanner and for controlling the tension in said tape comprising:
   a pair of compliance arms;
   a tape pick-up roller mounted at one end of each compliance arm;
   a pair of transfer arms;
   means for mounting one ends of said transfer arms at spaced locations for pivotable movement between first and second positions, said transfer arms pivoting in opposite angular directions;
   means for mounting the other ends of said compliance arms on the other ends of said transfer arms, said compliance arms being positioned so that said pick-up rollers are behind said tape when said tape is fully retracted within said video cassette and said transfer arms are in said first positions;

means for driving said transfer arms from said first to said second positions;

means for pivoting said compliance arms relative to said transfer arms, in opposite angular directions, during movement of said transfer arms from said first to said second positions whereby said rollers withdrawn said tape from said cassette, said compliance arms being freely, angularly pivotable when said transfer arms are in said second positions; and means for applying a rotational force to said compliance arms when said transfer arms are in said second positions to control the tension in said tape wrapped around said pick-up rollers thereon.

6. A mechanism according to claim 5 wherein said force applying means comprises:

a pair of springs; and means for operatively connecting said springs to said compliance arms when said transfer arms are in said second positions to control the tension in the tape extending around said pick-up rollers on said compliance arm.

7. A mechanism according to claim 6 for use with a closed loop servo system including independent servo motors for driving the reels of said video cassette, further comprising:

means mounted on said other ends of said transfer arms for independently sensing the angular positions of said compliance arms relative to said transfer arms and for providing output signals proportional thereto, said output signals being applied to said servo motors to drive same as a function of the positions of said compliance arms.

8. A mechanism according to claim 7 wherein said angular positions sensing means comprises:

a potentiometer mounted on each of said transfer arms, said potentiometers having shafts connected to said other ends of said compliance arms for rotation therewith, each of said shafts of said potentiometers having a zero position and providing positive and negative output signals for angular positions of said shafts on opposite sides of said zero positions, and wherein said output signals of said potentiometers are applied to said servo motors to drive said motors to maintain said shafts of said potentiometers at said zero positions.

9. A mechanism according to claim 8, wherein said shafts of said potentiometers pass through said zero positions as said transfer arms move from said first to said second positions and wherein said springs are operatively connected to said compliance arms when said shafts of said potentiometers pass through said zero positions.

10. A mechanism according to claim 6 further comprising:

means for selectively increasing the force applied to either of said compliance arms to selectively increase the tension in said tape.

11. A mechanism according to claim 5 wherein the path of each of said pick-up rollers is approximately linear during movement of said transfer arms from said first to said second positions.

12. A mechanism according to claim 11 wherein said pick-up rollers are positioned closely adjacent each other when said transfer arms are in said first positions and wherein said paths of said pick-up rollers diverge from said cassette at an obtuse angle relative to each other.

13. A mechanism for withdrawing tape from a video cassette to prepare said tape for threading around a video scanner comprising:

a pair of compliance arms;

a tape pick-up roller mounted at one end of each compliance arm;

a pair of transfer arms;

means for mounting one ends of said transfer arms at spaced locations for pivotable movement between first and second positions, said transfer arms pivoting in opposite angular directions;

means for mounting the other ends of said compliance arms on the other ends of said transfer arms, said compliance arms being positioned so that said pick-up rollers are behind said tape when said tape is fully retracted within said video cassette and said transfer arms are in said first positions;

means for driving said transfer arms from said first to said second positions; and means for pivoting said compliance arms relative to said transfer arms, in opposite angular directions, during movement of said transfer arms from said first to said second positions whereby said rollers withdraw said tape from said cassette, said compliance arms pivoting means comprising:

a sun gear mounted for rotation coaxially with and independently of said one end of each transfer arm;

sear means for preventing rotation of said sun gears during at least a portion of said movement of said transfer arms from said first to said second positions;

an idler gear mounted for rotation on each transfer arm, intermediate said ends thereof, and engaging said sun gears; and a compliance arm gear mounted for rotation coaxially with and connected to said other end of each compliance arm and engaging said idler gears whereby rotation of said transfer arms relative to said sun gears causes rotation of said compliance arm gears via said idler gears and said pivoting of said compliance arms relative to said transfer arms.

14. A mechanism according to claim 13 further comprising:

a pair of tensioning arms;

means for connecting one ends of said tensioning arms to respective ones of said sun gears for rotation therewith, said sear means engaging the other ends of said tensioning arms;

a pair of springs;

means for connecting said springs between fixed points and said tensioning arms to apply forces thereto; and means for disengaging said sear means and said tensioning arms during movement of said transfer arms from said first to said second positions whereby the forces of said springs are transmitted from said tensioning arms via said gears to said compliance arms.

15. A mechanism according to claim 14 for use with a closed loop servo system including independent servo motors for driving the reels of said video cassette, further comprising:

means mounted on said other ends of said transfer arms for independently sensing the angular positions of said compliance arms relative to said transfer arms and for providing output signals proportional thereto, said output signals being applied to said servo motors to drive same as a function of the positions of said compliance arms.

16. A mechanism according to claim 15 wherein said angular positions sensing means comprises:
   a potentiometer mounted on each of said transfer arms, said potentiometers having shafts connected to said other ends of said compliance arms for rotation therewith.

17. A mechanism according to claim 16 wherein each of said shafts of said potentiometers has a zero position and provides positive and negative output signals for angular positions of said shafts on opposite sides of said zero positions, wherein said shafts pass through said zero positions as said transfer arms move from said first to said second positions, and wherein said sear means disengaging means disengages said sear means and said tensioning arms when said shafts of said potentiometers pass through said zero positions.

18. A mechanism according to claim 17 wherein said springs establish the tension in said tape, said tape extending around said pick-up rollers on said one ends of said compliance arms, and wherein said output signals of said potentiometers are applied to said servo motors to drive said motors to maintain said shafts of said potentiometers at said zero positions.

19. A mechanism according to claim 18 further comprising:
   means for selectively increasing the force applied to either of said tensioning arms to selectively increase the tension in said tape.

20. A mechanism according to claim 14 wherein said sear means comprises:
   a pair of sear arms; and
   means for connecting one end of each sear arm to a fixed pivot point, the other ends of said sear arms engaging said other ends of said tensioning arms to prevent rotation thereof around said one ends thereof; wherein said mechanism further comprises:
   means for biasing said sear arms into engagement with said tensioning arms; and wherein said sear means disengaging means comprises:
   means mounted on said transfer arms for contacting said sear arms and rotating said sear arms about said one ends thereof during movement of said transfer arms from said first to said second positions whereby said other ends of said sear arms release said other ends of said tensioning arms.

21. A mechanism according to claim 20 wherein movement of said transfer arms from said second to said first postions releases said sear arms and causes automatic engagement of said sear arms and said tensioning arms.

22. A mechanism according to claim 14 wherein each of said springs is a constant force tensioning spring whereby the force of said springs on said compliance arms is constant regardless of the positions thereof.

23. A mechanism according to claim 22 further comprising:
   means for selectively increasing the force applied to either of said tensioning arms to selectively increase the tension in said tape.

24. A mechanism according to claim 23 wherein said force increasing means comprises:
   a pair of additional springs;
   a pair of force applying arms, one ends of said arms being mounted coaxially with respective ones of said tensioning arms;
   means for connecting said additional springs between fixed points and the other ends of said force applying arms; and
   means for selectively connecting either of said force applying arms to its associated tensioning arm so that the force applied thereto is the sum of the forces applied by one of said springs and one of said additional springs.

25. A mechanism for withdrawing tape from a video cassette to prepare said tape for threading around a video scanner comprising:
   a pair of compliance arms;
   a tape pick-up roller mounted at one end of each compliance arm;
   a pair of transfer arms;
   means for mounting one ends of said transfer arms at spaced locations for pivotable movement between first and second positions, said transfer arms pivoting in opposite angular directions, each of said transfer arms including an additional arms section, one end of which is connected to said one end of said transfer arm and which extends generally laterally therefrom;
   means for mounting the other ends of said compliance arms on the other ends of said transfer arms, said compliance arms being positioned so that said pick-up rollers are behind said tape when said tape is fully retracted within said video cassette and said transfer arms are in said first positions;
   means for driving said transfer arms from said first to said second positions, said transfer arms driving means comprising:
   a drive motor having a drive shaft;
   a pair of linkages, one ends of said linkages being connected to said drive shaft; and
   a pair of drive arms, one ends of said drive arms being connected to the other ends of said linkages, generally coaxial therewith, the other ends of said drive arms being connected to the other ends of said arm sections of said transfer arms; and
   means for pivoting said compliance arms relative to said transfer arms, in opposite angular directions, during movement of said transfer arms from said first to said second positions whereby said rollers withdraw said tape from said cassette.

26. A mechanism according to claim 25 wherein said drive shaft rotates through an angle of approximately 180° to drive said transfer arms from said first to said second positions and wherein the velocity component of said tape as it is withdrawn from said cassette follows a sinusoidal relationship.

27. A mechanism for withdrawing tape from a video cassette to prepare said tape for threading around a video scanner and for controlling the tension in said tape comprising:
   a pair of compliance arms;
   a tape pick-up roller mounted on one end of each compliance arm;
   means for pivotably mounting the other ends of said compliance, arms, said compliance arms being positionable in first positions wherein said pick-up rollers are behind said tape when said tape is fully retracted within said video cassette, said compliance arms being pivotable to withdraw said tape from said cassette in two diverging directions;
means for applying a tension force to said compliance arms to control the tension in said tape wrapped around said pick-up rollers thereon; and
means mounted on said other ends of said compliance arms for independently sensing the angular positions thereof and for providing output signals proportional thereto, said output signals being usable for driving the reels of said video cassette.

* * * * *